United States Patent
Horng et al.

(10) Patent No.: US 6,664,756 B2
(45) Date of Patent: Dec. 16, 2003

(54) CONVERSION CIRCUIT FOR A DC BRUSHLESS MOTOR

(75) Inventors: Alex Horng, Kaohsiung (TW); Ying-Ya Lu, Kaohsiung Hsien (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 10/131,204

(22) Filed: Apr. 25, 2002

(65) Prior Publication Data

US 2003/0201739 A1 Oct. 30, 2003

(51) Int. Cl.[7] .................................................. H02P 1/50
(52) U.S. Cl. ........................................ 318/722; 318/439
(58) Field of Search ................................ 318/138, 720, 318/721, 723, 724, 254, 439, 722, 800; 324/119

(56) References Cited

U.S. PATENT DOCUMENTS

| | | | | |
|---|---|---|---|---|
| 3,365,646 A | * | 1/1968 | Brewster | 322/28 |
| 4,035,713 A | * | 7/1977 | Kawamoto et al. | 322/28 |
| 4,070,606 A | * | 1/1978 | Morozumi et al. | 318/254 |
| 4,096,420 A | * | 6/1978 | Gosling et al. | 318/254 |
| 4,700,116 A | * | 10/1987 | Inoue et al. | 318/254 |
| 5,099,181 A | * | 3/1992 | Canon | 318/254 |
| 5,606,232 A | * | 2/1997 | Harlan et al. | 318/138 |
| 6,091,216 A | * | 7/2000 | Takahashi et al. | 318/254 |
| 6,278,248 B1 | * | 8/2001 | Hong et al. | 318/254 |
| 6,307,337 B1 | * | 10/2001 | Nelson | 318/254 |
| 6,380,707 B1 | * | 4/2002 | Rosholm et al. | 318/439 |
| 6,456,024 B1 | * | 9/2002 | Schmider et al. | 318/254 |
| 6,479,956 B1 | * | 11/2002 | Kawabata et al. | 318/254 |

FOREIGN PATENT DOCUMENTS

| | | | | |
|---|---|---|---|---|
| JP | 62092789 A | * | 4/1987 | H02P/6/02 |
| JP | 06165568 A | * | 6/1994 | H02P/6/02 |

* cited by examiner

Primary Examiner—Robert Nappi
Assistant Examiner—Eduardo Colon-Santana
(74) Attorney, Agent, or Firm—Bacon & Thomas, PLLC

(57) ABSTRACT

The conversion circuit for a DC brushless motor in accordance with the present invention mainly comprises a rectifier circuit, a power smoothing circuit, and a low-voltage stabilizing circuit. The conversion circuit is used for converting alternating current into direct current for a driver circuit of the motor.

10 Claims, 4 Drawing Sheets

CONVERSION CIRCUIT FOR A DC BRUSHLESS MOTOR

BACKGROUND OF THE INVENTION

1. Field of the Invention

The present invention relates to a conversion circuit for a DC brushless motor, and more particularly to a power supply conversion circuit that converts alternating current into direct current for the DC brushless motor.

2. Description of the Related Art

Demands for an AC motor are currently not only to reduce dimensions but also to increase heat dissipation effect. A rotor and a stator construct a traditional AC motor, and the stator alternatively generates a magnetic field to induce the rotor to rotate. A drawback of the traditional AC motor is that the entire structure of the stator coil and the ole plate has been designed with enlarged dimensions to meet requirements of applied in AC 220V or 110V. As a result, decrease of the dimensions of the AC motor has been limited. In miniature fan applications, dimensional limitations of the fan blades and airflow channels are also limited, and thus it is hard in design to increase amounts of air cooling.

As to a traditional DC brushless motor, it has simplified structure that is suitable for a smaller dimension of the miniature fan. This DC brushless motor can be designed not only for an increased amount of air-cooling but also for a decreasingly overall cost of the motor.

FIG. 1 illustrates a schematic view of a traditional driver circuit for a double phase DC brushless motor.

Referring to FIG. 1, the driver circuit for the double phase DC brushless motor includes a first coil L1, a second coil L2, a first transistor Q1, a second transistor Q2, five resistors R1 through R5, a Hall element IC1, a driver element IC2, and a capacitor C. The Hall element IC1 is used for detecting changes of a permanent magnetic field of a rotor to thereby output weaker Hall voltage. And then the Hall voltage is magnified by the driver element IC2 to further output alternative signals (square waveforms) from two terminals O1 and O2 to the transistors Q1 and Q2 respectively. The transistors Q1 and Q2 are actuated in turn to change directions of coil current so as to rotate the rotor.

FIG. 2 illustrates a schematic view of a traditional driver circuit for a single phase DC brushless motor.

Referring to FIG. 2, the driver circuit for the single phase DC brushless motor includes a coil L1, four transistors Q1 through Q4, five resistors R1 through R5, a Hall element IC1, a driver element IC2, and a capacitor C. The Hall element IC1 is used for detecting changes of a permanent magnetic field of a rotor to thereby output weaker Hall voltage. And then the Hall voltage is magnified by the driver circuit IC2 to further output alternative signals (square waveforms) from two terminals O1 and O2 to the bridging transistors Q1 through Q4. The transistors Q1 through Q4 are actuated in turn to change directions of coil current so as to rotate the rotor.

Although both of the above-mentioned single and double phase DC brushless motors have the advantage of reduced dimensions, simplified structure, and lowered overall cost, they are applied only in lower voltage and limited by operating voltage range. In other words, the traditional DC brushless motor is unavailable for the higher voltage of an AC power supply. However, the DC brushless motor is capable of applying the higher voltage of an AC power supply if the driver circuit is improved. Thus, the motor is not only capable of application to a broadened operating voltage range but also accomplishing reduced dimensions, simplified structure, and lowered overall cost.

The present invention intends to provide a conversion circuit converting alternating current into direct current for the DC brushless motor in such a way to mitigate and overcome the above problem.

SUMMARY OF THE INVENTION

The primary objective of this invention is to provide a conversion circuit for a DC brushless motor converting alternating current into direct current for the DC brushless motor so that the operating voltage range of the motor is broadened.

The secondary objective of this invention is to provide a conversion circuit for a DC brushless motor comprising a rectifier circuit, a power smoothing circuit, and a low-voltage stabilizing circuit used for providing direct current to a driver circuit of the motor in order to operate it steady.

The present invention is a conversion circuit for a DC brushless motor. The conversion circuit mainly comprises a rectifier circuit, a power smoothing circuit, and a low-voltage stabilizing circuit. The conversion circuit is used for converting alternating current into direct current for a driver circuit of the motor.

Other objectives, advantages and novel features of the invention will become more apparent from the following detailed description and the accompanying drawings.

BRIEF DESCRIPTION OF THE DRAWINGS

The present invention will now be described in detail with reference to the accompanying drawings, wherein.

DETAILED DESCRIPTION OF THE INVENTION

Figure 1:
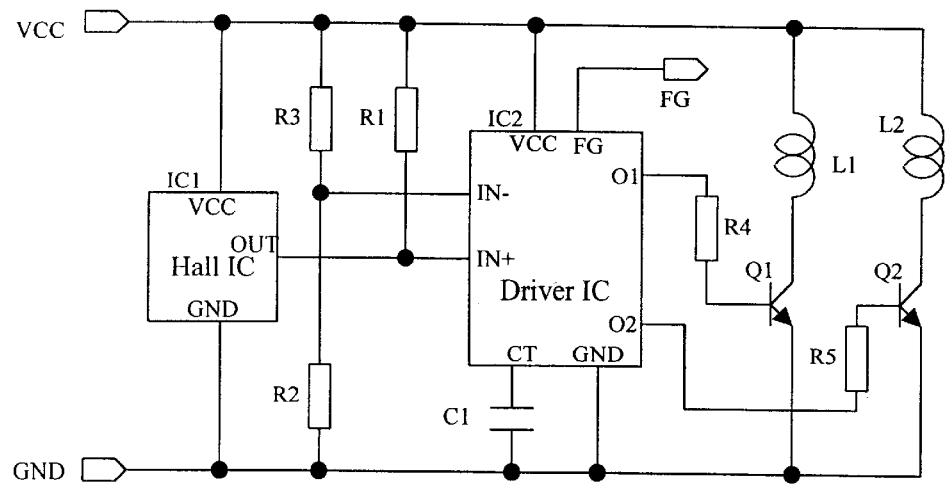
FIG. 1 is a schematic view of a traditional driver circuit for a double phase DC brushless motor.
Figure 2:
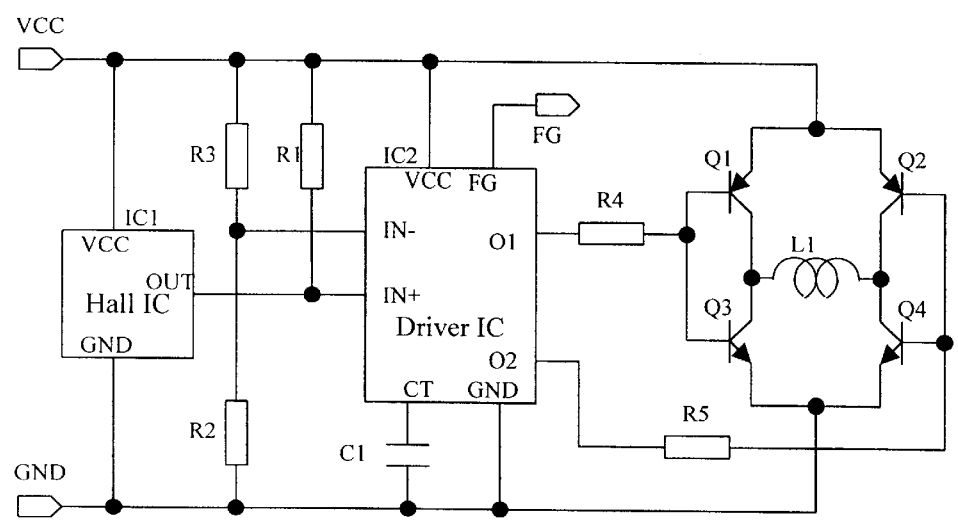
FIG. 2 is a schematic view of a traditional driver circuit for a single phase DC brushless motor.

Referring now to the drawings, there are two embodiments of the present invention shown therein, which include generally a primary driver member applied either in a single or double phase motor and a secondary conversion member.

Figure 3:
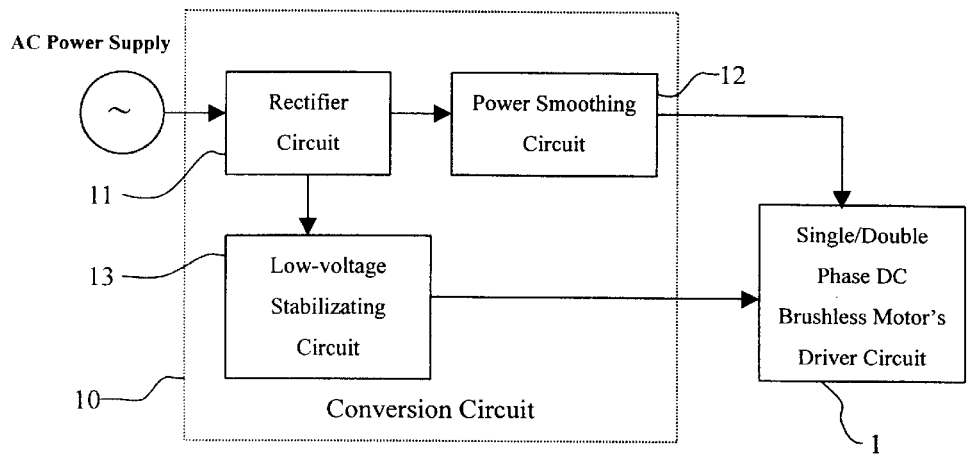
FIG. 3 is a block diagram of a conversion circuit for a DC brushless motor in accordance with the present invention.

FIG. 3 illustrates a block diagram of a conversion circuit for a DC brushless motor in accordance with the present invention. Referring to FIG. 3, a driver circuit and a conversion circuit are designated as numeral 1 and 10 respectively. The conversion circuit in accordance with the present invention mainly includes a rectifier circuit designated as numeral 11, a power smoothing circuit as numeral 12, and a low-voltage stabilizing circuit as numeral 13. Much of the other detailed structure of the driver circuit 1 is omitted.

Referring again to FIG. 3, the conversion circuit 10 is used for converting alternating current into direct current for the driver circuit 1. The rectifier circuit 11 rectifies the voltage input from the power supply and outputs a pulse DC voltage. Subsequently, the pulse DC voltage from the rectifier circuit 11 passes the power smoothing circuit 12 to appropriately attenuate large changes of in the voltage and thereby reduce to zero the voltage ratio over a full duty cycle. The smoothing degree of fine-tuning can be adjusted depending upon motor characteristics. Since a driver IC is sophisticated, it has a need for a stabilized operating voltage to ensure steady operation. Hence, the rectifier circuit 11 further outputs a pulse DC voltage passing through the low-voltage stabilizing circuit and then the stabilized voltage is output to the driver circuit.

Figure 4:
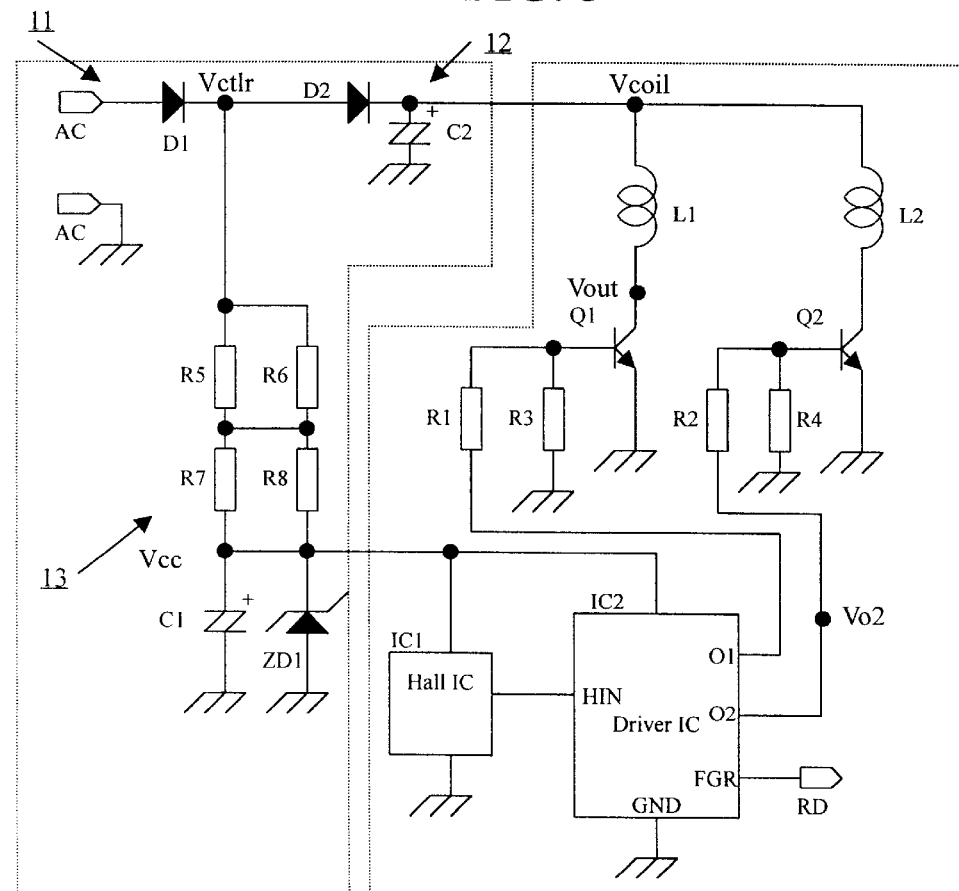
FIG. 4 is a schematic view of a conversion circuit for a DC brushless motor in accordance with a first embodiment of the present invention applied in a driver circuit of a double phase motor.

FIG. 4 illustrates a schematic view of a conversion circuit for a DC brushless motor in accordance with a first embodiment of the present invention applied in a driver circuit of of a double phase motor. FIGS. 5A–5F are waveforms at selected reference points in the conversion circuit in accordance with the present invention.

Referring now to FIG. 4, reference numerals of the first embodiment have applied the identical numerals of the traditional double phase DC brushless motor. The driver circuit 1 of the double phase motor of the first embodiment has the similar configuration and same function as the traditional driver circuit and the detailed descriptions are omitted.

Figure 5A:
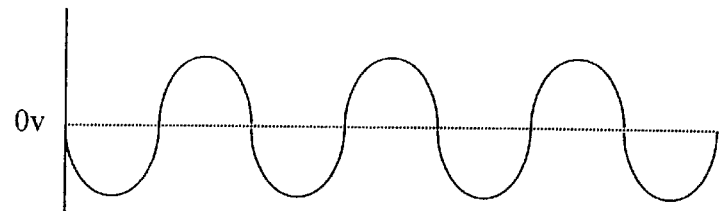
FIG. 5A is a waveform of at a selected reference point (power supply) in the conversion circuit in accordance with the present invention.
Figure 5B:
FIG. 5B is a waveform of at a selected reference point ($V_{ctrl}$) in the conversion circuit in accordance with the present invention after rectified.
Figure 5C:
FIG. 5C is a waveform of at a selected reference point ($V_{coil}$) in the conversion circuit in accordance with the: present invention after smoothened.

The driver circuit 1 is electrically connected to the conversion circuit 10. The conversion circuit 10 includes a rectifier circuit 11, a power smoothing circuit 12, and a low-voltage stabilizing circuit 13. The rectifier circuit 11 comprises a diode D1 used to half-wave rectify the voltage from the power supply into a pulse DC voltage outputting to a Hall element IC1, a driver element IC2, and coils L1 and L2. FIG. 5A illustrates a waveform of at a selected reference point (power supply) in the conversion circuit 10. FIG. 5B illustrates a waveform of at a selected reference point ($V_{ctrl}$) in the conversion circuit 10 after being rectified by the rectifier circuit 11. FIG. 5C illustrates a waveform of at a selected reference point ($V_{coil}$) in the conversion circuit 10 after being smoothed by the power smoothing circuit 12.

The power smoothing circuit 12 consists of a diode D2 and a capacitor C2. The pulse DC voltage output from the rectifier circuit 11, as shown in FIG. 5B, is filtered by the capacitor C2 which discharges to raise the voltage in each half-cycle of the pulse DC voltage that performs a smooth pulse voltage $V_{ctrl}$, as shown in FIG. 5C. Subsequently, the smooth pulse voltage performs a shorter duration of passing zero potential during each positive half-wave cycle. On the contrary, the capacitor C2 does not fully discharge during the negative half-wave cycle. Thus, the power smoothing circuit 12 attenuates the large changes of the voltage in the coils L1 and L2 so as to reduce electrical noise generated by the large change of current in the coils. The diode D2 has a high counter resistance used to obstruct the higher smooth pulse voltage ($V_{coil}$) back flowing through it to pass the selected reference point ($V_{ctrl}$). The diode D2 insulates between the selected reference points ($V_{ctrl}$) and ($V_{coil}$) to maintain the lower DC voltage at ($V_{ctrl}$) so as to output the lower DC voltage to the Hall element IC1 and the driver element IC2.

Figure 5D:
FIG. 5D is a waveform of at a selected reference point ($V_{out}$) in the conversion circuit in accordance with the present invention after passing a coil.
Figure 5E:
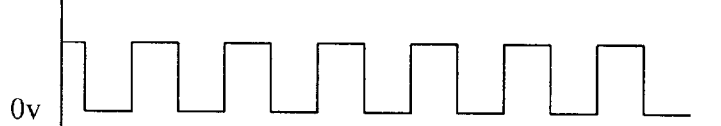
FIG. 5E is a waveform of at a selected reference point ($V_{o2}$) in the conversion circuit in accordance with the present invention outputting from a driver circuit.
Figure 5F:
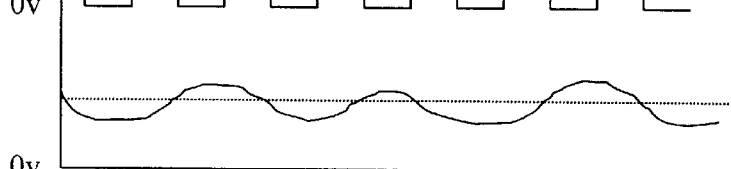
FIG. 5F is a waveform of at a selected reference point (Vcc) in the conversion circuit in accordance with the present invention after stabilized.

FIG. 5F illustrates a waveform of at a selected reference point (Vcc) in the conversion circuit in accordance with the present invention after stabilization by the low-voltage stabilizing circuit 13. The low-voltage stabilizing circuit 13 of four resistors R5, R6, R7, R8, a capacitor C1 and a zener diode ZD1. The resistors R5, R6, R7, R8 form a voltage drop circuit, dropping the higher pulse DC voltage output from the rectifier circuit 11. Subsequently, these resistors and the capacitor C1 form a filter circuit, filtering the higher pulse DC voltage to perform a voltage waveform at the selected reference point (Vcc), as shown in FIG. 5F. The zener diode ZD1 provides a degree of stabilizing and stabilizes the higher pulse DC voltage at a predetermined DC voltage value providing for the Hall element IC1 and the driver element IC2.

FIG. 5D illustrates a waveform of at a selected reference point ($V_{out}$) in the conversion circuit in accordance with the present invention after passing the coil L1. FIG. 5E illustrates a waveform at a selected reference point ($V_{o2}$) in the conversion circuit in accordance with the present invention output from a driver element IC2. The low-voltage stabilizing circuit 13 supplies a stabilized pulse DC voltage to the Hall element IC1 and the driver element IC2. The driver element IC2 produces an output signal having a waveform at the reference point ($V_{o2}$) as shown in FIG. 5E, and supplies the waveform to two transistors Q1 and Q2 to actuate the coils L1 and L2. For example, the driver element IC2 produces a square-wave signal output to the transistor Q1 so that the transistor Q1 can be switched stably to actuate the coil L1 which results in outputting a waveform of voltage at the reference point ($V_{out}$) as shown in FIG. 5F.

Referring again to FIG. 5D, the reference point ($V_{out}$) indicates that the pulse DC voltage affects the coils resulting in outputting a discontinuous waveform which will not affect the normal operation of the motor. This discontinuous waveform substantially reduces an overall average of the total power input. Accordingly, the coil of the motor is available for low resistance or low loop. Once the number of loops of the coil is reduced, the thickness of the motor is reduced. In this manner, the motor in accordance with the present invention accomplishes both use of AC power and reduced dimensions.

Figure 6:
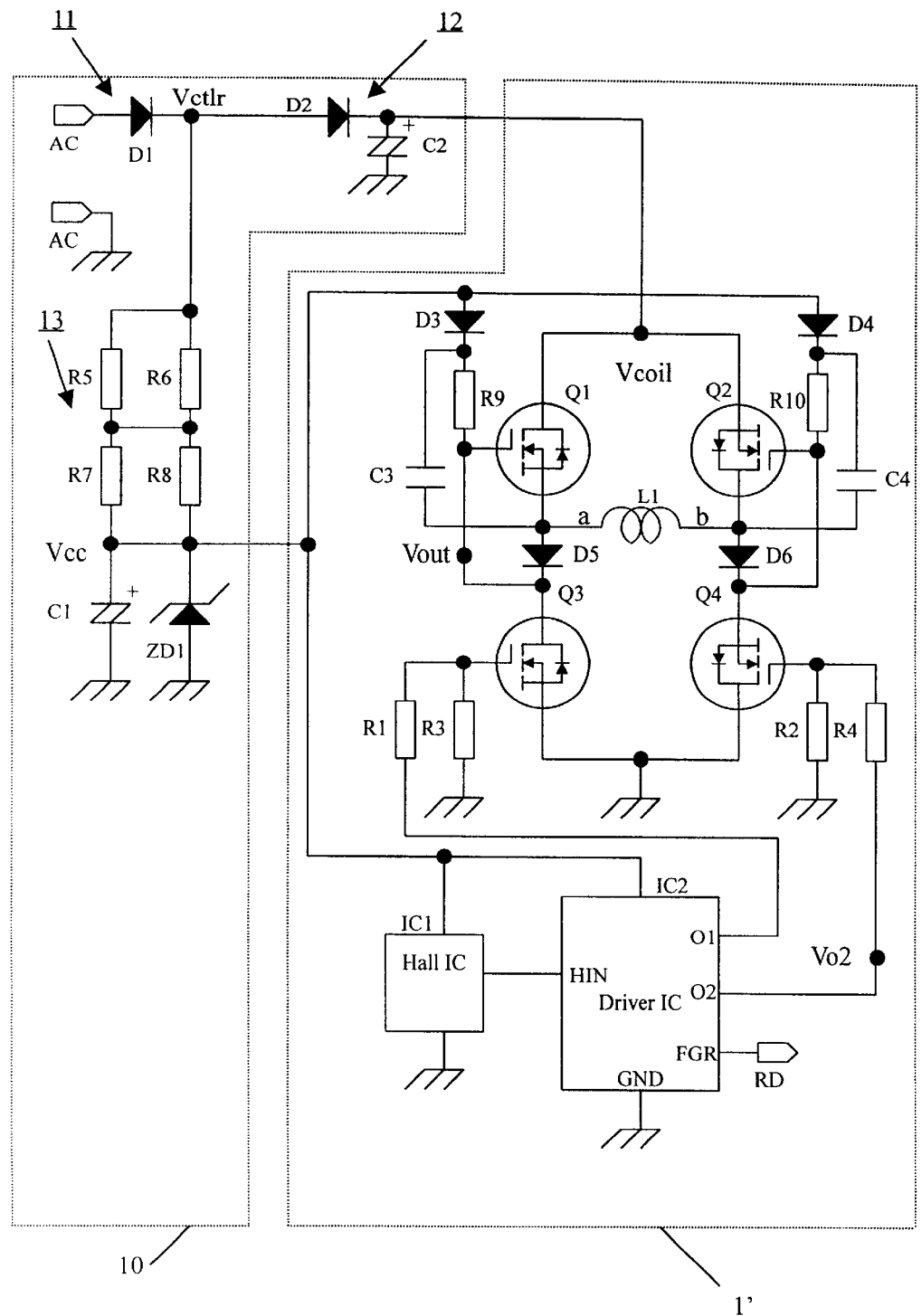
FIG. 6 is a schematic view of a conversion circuit for a DC brushless motor in accordance with a second embodiment of the present invention applied in a driver circuit of a single phase motor.

Referring to FIG. 6, reference numerals of the second embodiment have applied the identical numerals of the traditional single phase DC brushless motor. The driver circuit 1' and the conversion circuit 10 of the single phase motor of the second embodiment has the similar configuration and same function as the traditional driver circuit and the first embodiment. And the identical detailed descriptions are omitted.

Referring again to FIG. 6, the driver circuit 1' comprises two constant current circuits and two switch circuits, commonly connecting to two ends of a coil L1 at a and b. The first constant current circuit is consisted of a field effect transistor Q1, a diode D3, a resistor R9, and a capacitor C3, by contrast to the second constant current circuit consisted of a field effect transistor Q2, a diode D4, a resistor R10, and a capacitor C4. The first switch circuit is consisted of two resistors R1 and R3, and a field effect transistor Q3, by contrast to the second switch circuit consisted of two resistors R2 and R4, and a field effect transistor Q4. The driver element IC2 produces output signals to the two transistors Q3 and Q4 to thereby control switching so as to change the voltage at the two ends of the coil L1 at a and b.

Operation of the driver element IC2 with respect to the transistors Q3 and Q4 shall now be described in detail. When the transistor Q3 is turned on by the signal of the driver element IC2, conduction occurs between the drain and the source of the transistor Q3 resulting in a low voltage at the end of the coil L1 at a. in the same time the base of the transistor Q1 powered from the diode D5 is lower than 7.0 V voltage and then cutoff by its counter bias voltage. When the transistor Q4 is turned off by the signal of the driver element IC2, cutoff between the drain and the source of the transistor Q4 occurs, resulting in a high voltage at the other end of the coil L1 at b. in the same time the base of the transistor Q2 powered from the diode D4 and the resistor R10 is rendered conductive to permit a bias current to pass the diode D6. The smooth pulse DC voltage ($V_{coil}$) is initially passes through the drain and the source of the transistor Q2, passing through the coil L1 from the end b to the other end a, and eventually passing through the drain and the source of the transistor Q3 to ground when the motor is operated in a full duty cycle. Then, in the next duty cycle, the transistors Q1 through Q4 is are controlled in a manner opposite that of the control during the previous duty cycle.

Although the invention has been described in details with references to its presently preferred embodiment, it will be understood by one of ordinary skill in the art that various modifications can be made without departing from the spirit and the scope of the invention, as set forth in the appended claims.

What is claimed is:

1. A conversion circuit for a DC brushless motor comprising:
    a rectifier circuit for rectifying a voltage from a power supply to a pulse DC voltage for operating a driver element of the motor;
    a power smoothing circuit for smoothing the pulse DC voltage from the rectifier circuit to attenuate large changes in the voltage so as to reduce a voltage ratio to zero over a full cycle, and output a smooth pulse DC voltage to a coil of the motor;
    a low-voltage stabilizing circuit for stabilizing the pulse DC voltage from the rectifier circuit at a low voltage and then outputting the stabilized pulse DC voltage to a driver element of the motor.

2. The conversion circuit as defined in claim 1, wherein the rectifier circuit comprises a diode.

3. The conversion circuit as defined in claim 1, wherein the power smoothing circuit comprises a diode and a capacitor.

4. The conversion circuit as defined in claim 1, wherein the low-voltage stabilizing circuit comprises four resistors, a capacitor, and a zener diode.

5. The conversion circuit as defined in claim 1, wherein the conversion circuit is applied in a double phase DC brushless motor.

6. The conversion circuit as defined in claim 1, wherein the conversion circuit is applied in a single phase DC brushless motor.

7. The conversion circuit as defined in claim 6, wherein the driver element comprises two constant current circuits and two switch circuits.

8. The conversion circuit as defined in claim 7, wherein the constant current circuit comprises a field effect transistor, a diode, a resistor, and a capacitor.

9. The conversion circuit as defined in claim 7, wherein the switch circuit comprises two resistors, and a field effect transistor.

10. The conversion circuit as claimed in claim 1, wherein the rectifier circuit is a half-wave rectifier circuit arranged to provide a relatively low dc voltage with respect to the power supply, the relatively low dc voltage being suitable for the DC brushless motor; wherein the half-wave rectifier circuit is serially connected between the power supply and the more.

* * * * *